United States Patent
Wang

(10) Patent No.: US 9,992,106 B2
(45) Date of Patent: Jun. 5, 2018

(54) GENERATING A HOST ROUTE

(71) Applicant: Hangzhou H3C Technologies Co., Ltd., Hangzhou (CN)

(72) Inventor: Feng Wang, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days. days.

(21) Appl. No.: 14/768,186

(22) PCT Filed: Mar. 14, 2014

(86) PCT No.: PCT/CN2014/073436
§ 371 (c)(1),
(2) Date: Aug. 14, 2015

(87) PCT Pub. No.: WO2014/139462
PCT Pub. Date: Sep. 18, 2014

(65) Prior Publication Data
US 2016/0014025 A1    Jan. 14, 2016

(30) Foreign Application Priority Data

Mar. 14, 2013   (CN) .......................... 2013 1 0081792

(51) Int. Cl.
*H04L 12/721* (2013.01)
*H04L 29/08* (2006.01)
(Continued)

(52) U.S. Cl.
CPC .......... *H04L 45/66* (2013.01); *G06F 9/45558* (2013.01); *H04L 12/4633* (2013.01); *H04L 45/64* (2013.01); *H04L 61/2007* (2013.01); *H04L 67/148* (2013.01); *H04L 67/38* (2013.01); *G06F 2009/4557* (2013.01);
(Continued)

(58) Field of Classification Search
CPC ....... H04L 12/46; H04L 12/715; H04L 29/08; H04L 29/12; H04L 45/66; H04L 45/64; H04L 61/2007; H04L 67/148
See application file for complete search history.

(56) References Cited

U.S. PATENT DOCUMENTS

| | | | |
|---|---|---|---|
| 2008/0291920 A1* | 11/2008 | Serbest | H04L 12/4633 370/395.31 |
| 2010/0287548 A1* | 11/2010 | Zhou | G06F 9/4856 718/1 |
| 2011/0002220 A1* | 1/2011 | Park | H04W 60/005 370/230 |

FOREIGN PATENT DOCUMENTS

| | | |
|---|---|---|
| CN | 101312438 A | 11/2008 |
| CN | 101465812 | 6/2009 |

(Continued)

OTHER PUBLICATIONS

International Search Report and Written Opinion dated May 28, 2014 issued on PCT Patent Application No. PCT/CN2014/073436 dated Mar. 14, 2014, State Intellectual Property Office, P.R. China.

(Continued)

*Primary Examiner* — Anez Ebrahim
(74) *Attorney, Agent, or Firm* — DEQI Intellectual Property Law Corporation

(57) ABSTRACT

According to an example, in a method for generating a host route, a host route entry may be generated based on an IP address of a virtual machine, and an update message carrying a host route of the host route entry may be sent to an IBGP peer.

20 Claims, 5 Drawing Sheets

(51) Int. Cl.
*H04L 29/06* (2006.01)
*H04L 12/46* (2006.01)
*H04L 12/715* (2013.01)
*H04L 29/12* (2006.01)
*G06F 9/455* (2018.01)
*H04L 12/751* (2013.01)

(52) U.S. Cl.
CPC .... *G06F 2009/45595* (2013.01); *H04L 45/02* (2013.01); *H04L 45/04* (2013.01); *H04L 2212/00* (2013.01)

(56) References Cited

FOREIGN PATENT DOCUMENTS

| CN | 101617305 A | 12/2009 |
|---|---|---|
| CN | 102045237 A | 5/2011 |
| CN | 102594652 | 7/2012 |
| CN | 102821028 | 12/2012 |
| WO | WO-2008/089303 A1 | 7/2008 |
| WO | WO-2012031487 | 3/2012 |
| WO | WO-2012/119390 A1 | 9/2012 |
| WO | WO-2012/168795 A1 | 12/2012 |

OTHER PUBLICATIONS

Extended European Search Report, EP Application No. 14762986.9, dated Oct. 14, 2016, pp. 1-10, EPO.

Search Report, CN Application No. 201310081792.5, dated Sep. 22, 2016, pp. 1-2, SIPO.

X. Xu et al., "Virtual Subnet: A Host Route Based Subnext Extension Solution," Network Working Group, Internet Draft, Jul. 5, 2012, pp. 1-17, IETF Trust.

* cited by examiner

GENERATING A HOST ROUTE

CLAIM FOR PRIORITY

The present application is a national stage filing under 35 U.S.C 371 of PCT application number PCT/CN2014/073436, having an international filing date of Mar. 14, 2014, which claims priority to Chinese application number 201310081792.5, having a filing date of Mar. 14, 2013, the disclosures of which are hereby incorporated by reference in their entireties.

BACKGROUND

In order to achieve high reliability and redundancy deployment, many enterprise networks and data centers include multiple layer-2 networks located in different geographical locations. These layer-2 networks located in different geographical positions deploy similar businesses, and may achieve layer-2 network interconnection via Ethernet virtual interconnection (EVI) technology, Overlay Transport Virtualization (OTV) technology, and the like. A virtual machine may migrate among the layer-2 networks to achieve dynamic allocation and management of resources among the layer-2 networks.

An Internet user may access an application service provided by a virtual machine in a layer-2 network through an Internet access service provider. However, the user does not perceive the location of the virtual machine providing the application service. Therefore, when the virtual machine migrates from one layer-2 network to another layer-2 network, the IP address of the migrated virtual machine should not change.

BRIEF DESCRIPTION OF THE DRAWINGS

For a better understanding of the present disclosure, reference should be made to the Detailed Description below, in conjunction with the following drawings in which like reference numerals refer to corresponding parts throughout the figures.

DETAILED DESCRIPTION

Reference will now be made in detail to examples, which are illustrated in the accompanying drawings. In the following detailed description, numerous specific details are set forth in order to provide a thorough understanding of the present application. Also, the figures are illustrations of an example, in which modules or procedures shown in the figures are not necessarily essential for implementing the present application. In other instances, well-known methods, procedures, components, and circuits have not been described in detail so as not to unnecessarily obscure aspects of the examples. As used herein, the term "includes" means includes but not limited to, the term "including" means including but not limited to. The term "based on" means based at least in part on. In addition, the terms "a" and "an" are intended to denote at least one of a particular element.

Figure 1:
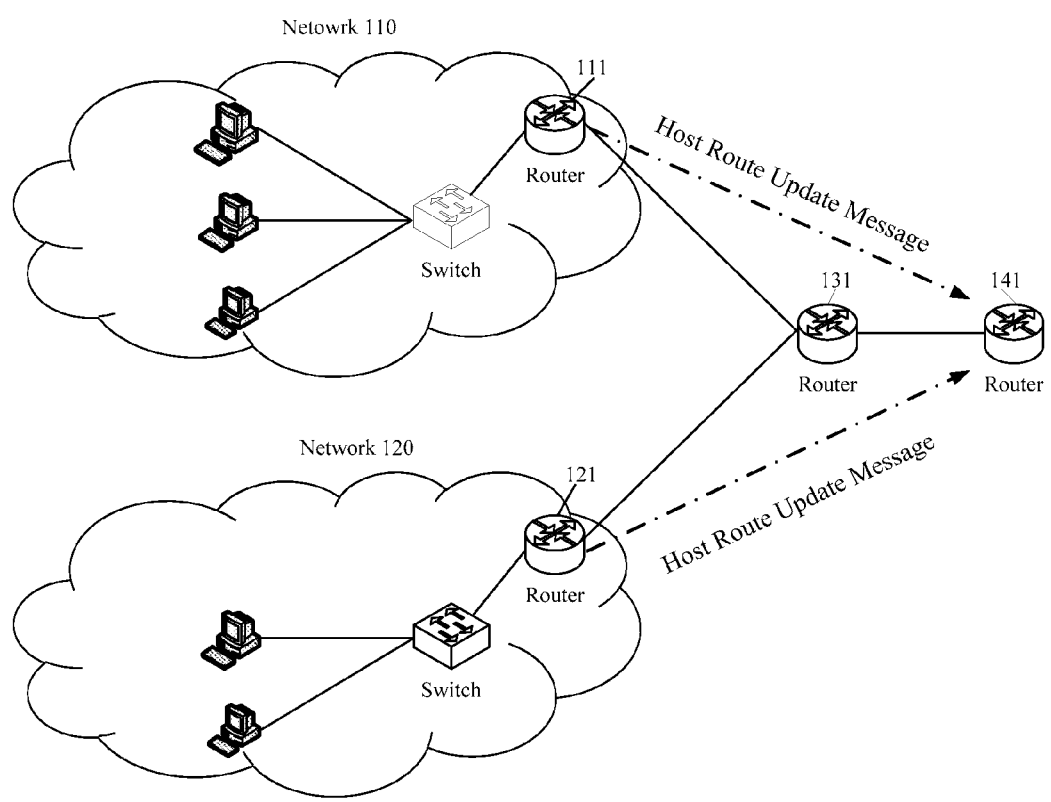
FIG. 1 is a schematic diagram illustrating an application mode in accordance with an example of the present disclosure.

As shown in FIG. 1, a network 110 and a network 120 are layer-2 networks located in different geographical positions of a data center. The router 111 is a gateway device of the network 110, and the router 121 is a gateway device of the network 120. The router 141 is an entrance network device of a service provider. The router 131 is an intermediate routing device between the routers 111,121 and the router 141.

The routers 111, 121 and 141 run IBGP. The router 141 is configured as an Internal border gateway protocol (IBGP) peer of the routers 111 and 121, and the routers 111 and 121 are configured as IBGP peers of the router 141. The router 111 and router 141 establish an IBGP session via a BGP open message. The router 121 and router 141 establish an IBGP session via a BGP open message. The routers 111 and 121 may generate host route entries based on IP addresses of virtual machines (VMs) or hosts, and may send host router update messages carrying host routes of the generated host route entries to the router 141.

Figure 2A:
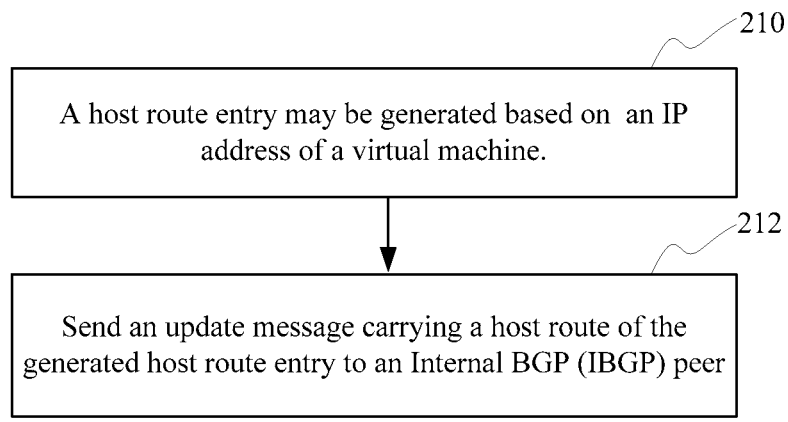
FIG. 2A is a flow diagram illustrating a method for generating a host route according to an example of the present disclosure.

FIG. 2A is a flow diagram illustrating a method for generating a host route by a gateway according to an example of the present disclosure. As shown in FIG. 2A, the method may include the following operations.

In block 210, a host route entry may be generated based on an IP address of a virtual machine. The host route entry is an entry in a routing or forwarding table of the gateway. The host route entry comprises a host route. An IP address prefix and a length of the IP address prefix in the host route are respectively the IP address of the virtual machine and a length of the IP address.

In block 212, an update message carrying a host route of the generated host route entry may be sent to an IBGP peer. An IP address prefix of the host route and a length of the IP address prefix respectively correspond an IP address of the virtual machine and a length of the IP address.

In the example, a local device may obtain the IP address of a virtual machine, generate a host route entry according to the obtained IP address, and send an update message carrying a host route of the generated host route entry to an Internal BGP (IBGP) peer of the local device.

Figure 2B:
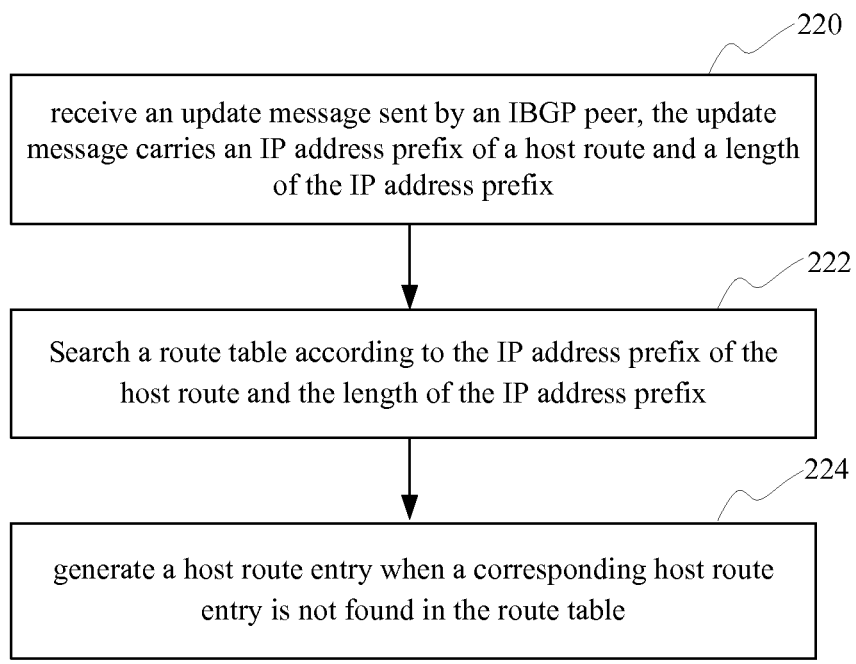
FIG. 2B is a flow diagram illustrating a method for generating a host route according to another example of the present disclosure.

FIG. 2B is a flow diagram illustrating a method for generating a host route by an entrance network device of a service provider according to another example of the present disclosure. As shown in FIG. 2B, the method may include the following operations.

In block 220, an update message sent by an IBGP peer may be received. The update message carries an IP address prefix of a host route and a length of the IP address prefix. The update message may be a BGP update message carrying path attributes of a host route.

In block 222 a route table may be searched according to the IP address prefix of the host route and the length of the IP address prefix.

In block 224, when it is determined that no host route entry is found, a host route entry may be established according to the IP address prefix of the host route and the length of the IP address prefix. The next-hop of the newly established host route entry is a general route encapsulation (GRE) tunnel connecting the entrance network device the IBGP peer.

Figure 3:
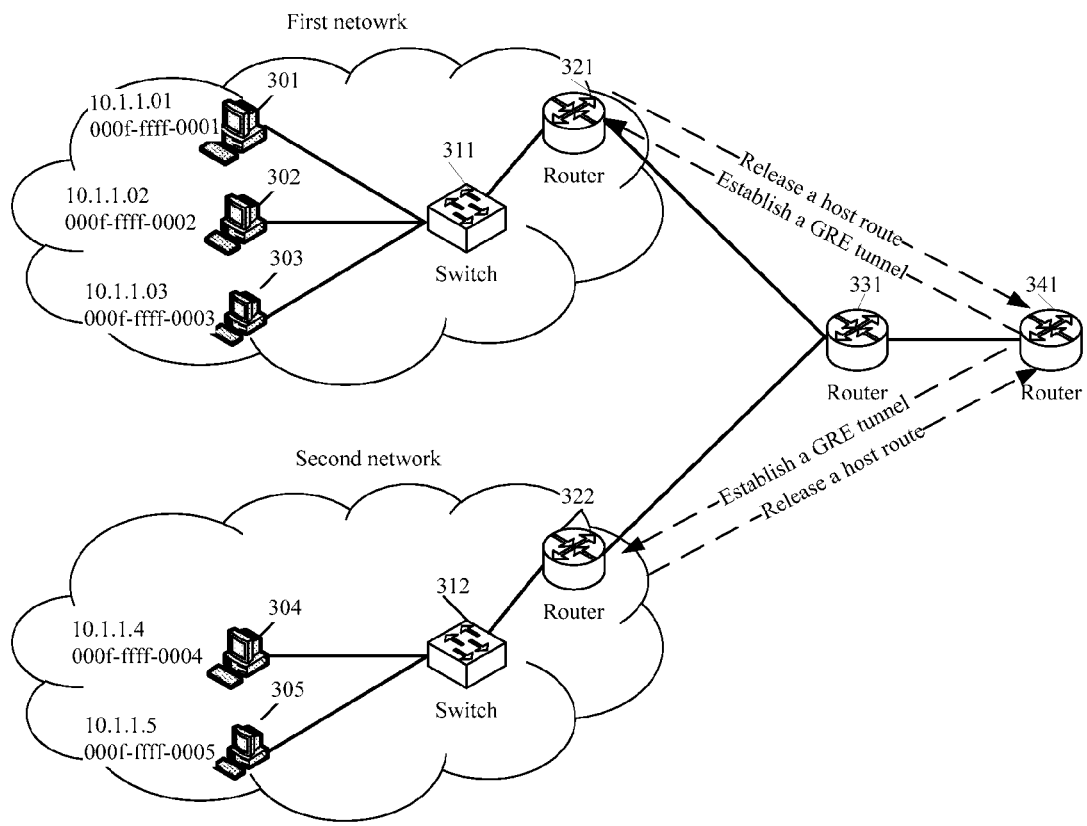
FIG. 3 is a schematic diagram illustrating how to release a host route by a gateway according to an example of the present disclosure.

FIG. 3 is a schematic diagram illustrating how to release a host route by a gateway according to an example of the present disclosure. As shown in FIG. 3, a first network and a second network are layer-2 networks located in different geographical positions of a data center. The layer-2 network interconnection may be achieved between the layer-2 networks by employing Ethernet virtual interconnection (EVI) technology or overlay transport virtualization (OTV) technology. The router 321 is a gateway device of the first network, and the router 322 is a gateway device of the second network. The router 341 is an entrance network device of a service provider. The router 331 is an intermediate routing device between the router 321 and the router 341. The host is a device in the Internet.

The routers 321, 331 and 341 run IBGP. The router 341 is configured as an IBGP peer of the routers 321 and 322, and the routers 321 and 322 are configured as IBGP peers of the router 341. The router 321 and router 341 establish an IBGP session via a BGP open message. The router 322 and router 341 established an IBGP session via a BGP open message. The routers 321, 322 and 341 may further communicate with each other through interior gateway protocol (IGP), such as open shortest path first (OSPF) protocol. The routers 321 and 322 may respectively release a network-segment route of the local network according to the IGP, and then the router 341 may record corresponding route entries in the local route table. When the network-segment routes released by the routers 321 and 322 are the same, the router 341 may record a corresponding equal-cost route entry in the local route table.

The virtual machines 301 to 303 in the first network may broadcast free address resolution protocol (ARP) messages. The free ARP message broadcasted by the virtual machine 301 is taken as an example, the Ethernet source MAC address is 000f-ffff-0001, the Ethernet destination MAC address is an all-F broadcast address; the sender IP address is 10.1.1.1, the sender MAC address is 000f-ffff-0001, the target IP address is 10.1.1.1, and the target MAC address is an all-zero MAC address.

After receiving the free ARP messages, a switch 311 may learn the MAC addresses, and forward the received ARP messages via a port which belongs to the virtual local area network (VLAN).

After receiving the free ARP messages, the router 321 may generate ARP entries of an ARP table and host route entries of a route table according to the sender IP addresses and the sender MAC addresses. The router 321 may send a BGP update message for releasing a host route to the router 341 (the IBGP peer).

Host route entries generated by the router 321 may be shown in the following table 1, in each host route entry generated by the router 321, the IP address prefix is the same as the IP address of a virtual machine, and the mask-length is 32 which is equivalent to the length of the IP address of the virtual machine.

TABLE 1

| IP address prefix | Mask-length | Next-hop |
|---|---|---|
| 10.1.1.1 | 32 | 10.1.1.1 |
| 10.1.1.2 | 32 | 10.1.1.2 |
| 10.1.1.3 | 32 | 10.1.1.3 |

In the BGP update message for releasing a host route, the source IP address is the IP address 1.1.1.1 of the router 321, the destination IP address is the IP address of an IBGP peer of the router 321. For example, the router 341 is an IBGP peer of the router 321, and so the destination IP address may for example be 2.2.2.1. The link layer packet bearing the BGP update message may be an Ethernet packet.

Figure 4:
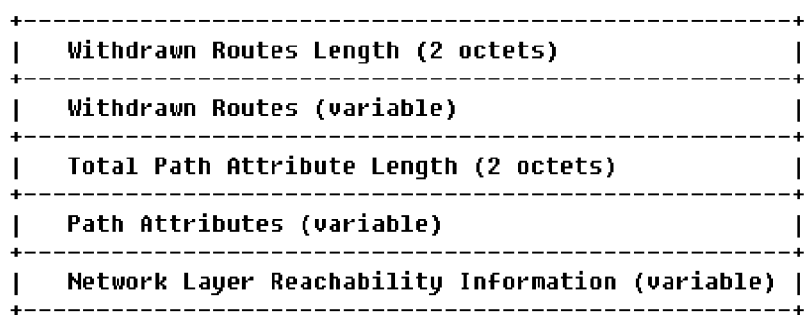
FIG. 4 is a schematic diagram illustrating a border gateway protocol (BGP) update message according to an example of the present disclosure.

FIG. 4 is a schematic diagram illustrating a BGP update message according to an example of the present disclosure. As shown in FIG. 4, the BGP update message may include a Withdrawn Routes Length field, a Withdrawn Routes field, a Total Path Attribute Length field, a Path Attributes field and a Network Layer Reachability Information (NLRI) field.

The BGP update message for releasing a host route does not include a withdrawn route, therefore the values of both of the Withdrawn Routes Length field and the Withdrawn Routes field are zero. The value of the Total Path Attribute Length field is 1, which indicates that there is one path attribute in the BGP update message.

In the example, the Path Attributes field may be extended to include a host route path attribute. The host route path attribute is a community attribute in path attributes, which indicates that all routes listed in the NLRI field possess the attribute.

The specific attribute type, attribute length, attribute value (T-L-V) of the host route path attribute is not limited in the example, and only some achievement examples of the attribute type field, attribute length filed and attribute value field of the host route path attribute are described hereinafter.

The attribute type field may include a flag field and a type code field. The flag field and the type code field may respectively take up one byte. In the example, the flag field may indicate that the path attribute belongs to an optional non-transitive attribute (when the router does not support the attribute, the attribute will be ignored, and other IBGP peers will not be informed of the attribute). The type code field may indicate the name of the path attribute. For instance, the value of the type code field may be set as 8, and the router may identify the host route path attribute according to the value of the type code field. The value of the type code field is not limited in the present example.

The attribute length filed may indicate the total length of the host route path attribute. For instance, the attribute length filed may be set as 4, indicating the total length of the host route path attribute is 4.

The attribute value field may indicate the value of the host route path attribute. The attribute value field may be set as the AS number of an autonomous system (AS) where the BGP network is located. In the example, the BGP network includes a first network, a second network, an intermediate router 331 and an entrance network device 341. Suppose the AS number of the BGP network is AS:1000.

The NLRI field may describe released host routes, and may be three two-tuples, namely <32, 10.1.1.1>, <32, 10.1.1.2>, <32, 10.1.1.3>.

The number of the host routes listed in the NLRI field is not limited in the example. When the router 321 releases N host routes via a BGP update message, the NLRI field includes N two-tuples, namely <Length1, Prefix1>, <Length2, Prefix2>, . . . <Length-n, Prefix-n>. N is an integer which is equal to or larger than 1. The length of the IP address prefix in a two-tuple is the same as the length of the IP address of a virtual machine, and the IP address prefix in a two-tuple is the same as the IP address of the virtual machine.

When receiving an ARP request message or an ARP response message of a virtual machine, the router 321 may also perform above mentioned process for releasing a host route. The router 321 may optionally release a host route. For instance, an access control list (ACL) may be configured in the router 321. When the router 321 determines that sender IP addresses 10.1.1.1, 10.1.1.2 and 10.1.1.3 in received free ARP messages, ARP request messages or ARP response messages are IP addresses configured in the ACL or belongs to a network segment configured in the ACL, the process for releasing a host route may be performed. When a sender IP address in a free ARP message received by the router 321 does not match any of the IP addresses in the ACL configured in the router 321, the router 321 may not perform the process for releasing a host route. The router 321 does not release a host route to other routers except the IBGP peer.

The router 331 may forward the received BGP update message by taking it as an ordinary IP packet and without perceiving whether it is a BGP packet.

The router 341 may receive the BGP update message, and identify the host route path attribute according to the type code field. When determining that the BGP update message is to release a host route, the router 341 will not forward the BGP update message carrying the host route path attribute, and not inform other IBGP peers of the BGP update message.

When determining that a generic routing encapsulation (GRE) tunnel reaching the router 321 is not established, the router 341 may establish a first GRE tunnel. The destination IP address of the first GRE tunnel interface is the IP address of an IBGP peer which releases the host route, namely the IP address 2.2.2.1 of the router 321. The source IP address of the first GRE tunnel interface is the IP address 1.1.1.1 of the router 341.

When determining that host route entries corresponding to the three host routes are not recorded in the route table, the router 341 may record the host route entries in the route table according to an IP address prefix and a lengths of the IP address prefix of each of two-tuples in the NLRI field and a tunnel ID Tunnel 1 of the established first GRE tunnel. The host route entries recorded by the router 341 may be shown in the following table 2.

TABLE 2

| IP address prefix | Mask-length | Next-hop |
|---|---|---|
| 10.1.1.1 | 32 | tunnel 1 |
| 10.1.1.2 | 32 | tunnel 1 |
| 10.1.1.3 | 32 | tunnel 1 |

In the second network, the virtual machines 304 and 305 broadcast free ARP messages. After receiving the free ARP messages, the switch 312 may perform MAC address learning according to Ethernet source MAC addresses, and forward the received ARP messages via a port which belongs to the same VLAN.

After receiving the free ARP messages, the router 322 may generate ARP entries and host route entries. The host route entries generated by the router 322 may be shown in the following table 3.

TABLE 3

| IP address prefix | Mask-length | Next-top |
|---|---|---|
| 10.1.1.4 | 32 | 10.1.1.4 |
| 10.1.1.5 | 32 | 10.1.1.5 |

The router 322 may send a BGP update message to the router 341. The principle of releasing a host route via a BGP update message by the router 322 may be the same as that of releasing a host route by the router 321, no further descriptions will be given in the example. In the BGP update message sent by the router 322, the NLRI field carries two-tuples <32, 10.1.1.4> and <32, 10.1.1.5>. The two-tuple <32, 10.1.1.4> indicates a reachable route of the virtual machine 304, and the two-tuple <32, 10.1.1.5> indicates a reachable route of the virtual machine 305.

The router 331 may forward the received BGP update message by taking it as an ordinary IP packet.

The router 341 may receive the BGP update message came from above mentioned router 322, and identify the host route path attribute according to the Path Attributes field in the BGP update message, and determine that the router 322 releases a host route. When determining that a GRE tunnel reaching the router 322 is not established, the router 341 may establish a second GRE tunnel. The source IP address and destination IP address of the second GRE tunnel are respectively the IP address 2.2.2.1 of the router 341 and the IP address 3.3.3.1 of the router 322.

The host route entries learned by the router 341 according to two-tuples in the NLRI field and the tunnel ID tunnel 2 of the second GRE tunnel may be shown in the table 4.

TABLE 4

| IP address prefix | Mask-length | Next-top |
|---|---|---|
| 10.1.1.1 | 32 | tunnel 1 |
| 10.1.1.2 | 32 | tunnel 1 |
| 10.1.1.3 | 32 | tunnel 1 |
| 10.1.1.4 | 32 | tunnel 2 |
| 10.1.1.5 | 32 | tunnel 2 |

When receiving a IP packet, the router 341 may search the route table for a host route entry matching with the destination IP address 10.1.1.1 according to the longest prefix match principle, and send the IP packet according to the next-top tunnel 1 in the host route entry. That is to say, an interface encapsulation entry of the first GRE tunnel is found, and the IP packed is encapsulated with an outer tunnel IP header and a GRE header, then a GRE tunnel packet is obtained. The passenger protocol of the encapsulated GRE header is IP protocol. The source IP address and the destination IP address of encapsulated tunnel IP header are respectively the source IP address 2.2.2.1 and destination IP address 1.1.1.1 of the first GRE tunnel. The router 341 may send the GRE tunnel packet via a physical port of the first GRE tunnel. The type of a message for bearing the IP packet received by the router 341 is not limited by the example. The type of tunnel packet is not limited either, any other tunnel protocol bearing layer-3 packet may be used.

The router 331 may receive the GRE tunnel packet, and forward the GRE tunnel packet to the router 321 according to the destination IP address 1.1.1.1 of the outer tunnel IP header.

When receiving the GRE tunnel packet, and determining that the destination IP address of the outer tunnel IP header is the IP address of the router 321, the router 321 may remove the GRE encapsulation (including the outer tunnel IP header and GER header), and find a host route entry matching with the destination IP address 10.1.1.1 from the local route table according to the longest prefix match principle. The router 321 may forward the received IP packet to the next-hop 10.1.1.1 in the host route entry. For instance, the router 321 may find a matching ARP entry according to the next-hop 10.1.1.1 from an ARP table, and encapsulate the IP packet into an Ethernet packet according to the matching ARP entry, and send the Ethernet packet via a port of the matching ARP entry.

As can be known according to technical solutions of above mentioned examples, when receiving IP packets which should be sent to virtual machines of different networks, the router 341 may send received IP packets to gateways of layer-2 networks where the virtual machines are respectively located through established GRE tunnels according to recorded host route entries. Even when the network segment routes released by gateways of different networks are the same, the router 341 may send received IP packets to gateways of layer-2 networks where the virtual machines are respectively located through GRE tunnels according to recorded host route entries.

Figure 5:
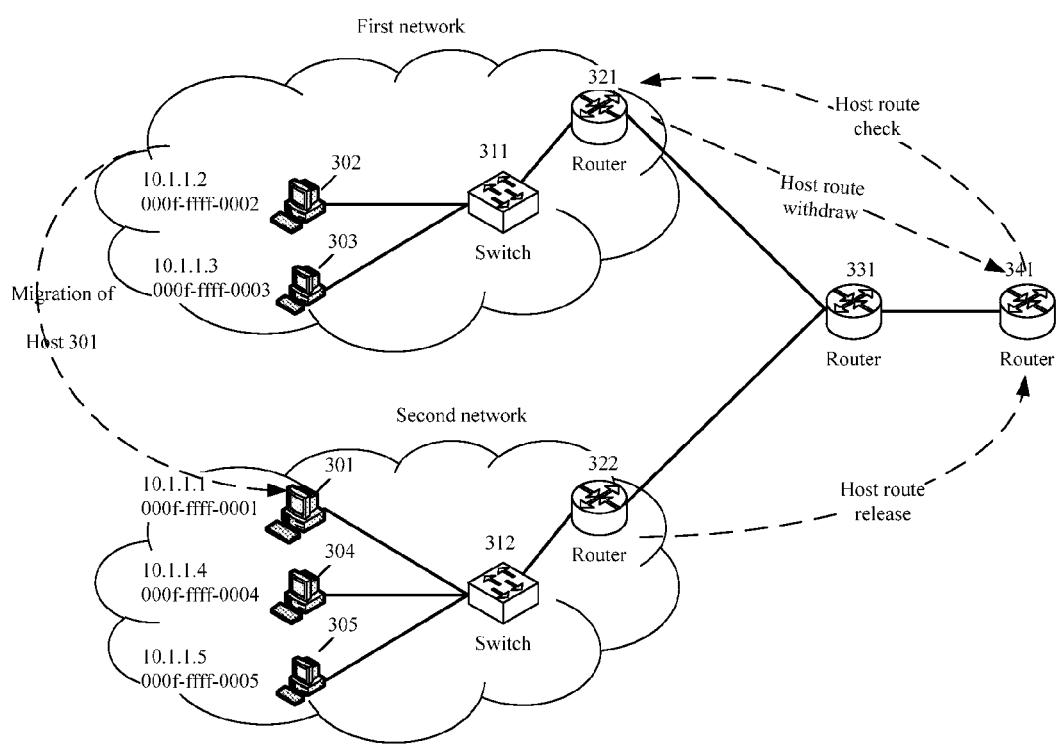
FIG. 5 is a schematic diagram illustrating how to release a host route of a migrated host by a gateway according to an example of the present disclosure.

FIG. 5 is a schematic diagram illustrating how to release a host route of a migrated host by a gateway according to an example of the present disclosure.

The virtual machine 301 may migrate to the second network, and after migration the virtual machine may send a free ARP message.

The switch 312 may receive the free ARP message broadcasted by the migrated virtual machine 301, and perform MAC address learning according to the Ethernet source MAC address of the free ARP message, and forward the received free ARP message via a port of the VLAN where the switch 312 is located.

The router 322 may receive the free ARP message from the virtual machine 301, and generate an ARP entry and a host route entry. The router 322 may send a BGP update message carrying a host route path attribute. The NLRI field of the BGP update message includes a reachable host route of the virtual machine 301 expressed by a two-tuple <32, 10.1.1.1>.

The router 341 may receive the BGP update message, and identify the host route path attribute field carried in the BGP update message. When determining that the second GRE tunnel reaching the router 322 has been established, the router 341 may find a host route entry from the route table according to the IP address prefix 10.1.1.1 and the length of the IP address prefix 32 carried in the NLRI field, and determine that the next-hop in the host route entry is tunnel 1 connecting the router 321, rather than tunnel 2 connecting the router 322, which indicates that the virtual machine may migrate to another layer-2 network. In order to ensure fast switching of the traffic, the router 341 may amend the next-top in the found host route entry to tunnel 2. The router 341 may set a to-be-checked identifier in the amended host route entry. Table 5 shows a host route entry configured with the to-be-checked identifier.

TABLE 5

| IP address prefix | Mask-length | Next-top |
|---|---|---|
| 10.1.1.1 | 32 | tunnel 2 (to-be-checked state) |
| 10.1.1.2 | 32 | tunnel 1 |
| 10.1.1.3 | 32 | tunnel 1 |

TABLE 5-continued

| IP address prefix | Mask-length | Next-top |
|---|---|---|
| 10.1.1.4 | 32 | tunnel 2 |
| 10.1.1.5 | 32 | tunnel 2 |

The router 341 may initiate a route check according to the next-hot tunnel 1 previously recorded in the host route entry, to check whether 10.1.1.1/32 is in the first network which the router 321 is responsible for. The router 341 may send a check message, such as a BGP update message for checking a host route. In the BGP update message, a source IP address and a destination IP address are respectively an IP address of the router 341 and an IP address of an IBGP peer of the router 341. When amending the next-top in the host route entry to tunnel 2, the router 341 may record the tunnel 1 previously recorded in the next-top in a software entry. Content recorded in the software entry may be deleted after the host route check is finished or be deleted regularly. The router 341 may determine that the IBGP peer is the router 321 according to the previously recorded next-top tunnel 1.

The BGP update message for checking a host route does not include a withdrawn route, therefore the values of both of the Withdrawn Routes Length field and the Withdrawn Routes field are zero. The value of the Total Path Attribute Length field is 1, which indicates that there is one path attribute in the BGP update message.

In the example, the Path Attributes field in the BGP update message for checking a host route may be extended to include a host route check path attribute. The host route check path attribute is a community attribute in path attributes, which indicates that all routes listed in the NLRI field possess the attribute. The router 341, which is taken as an entrance network device of a service provider, may send a BGP update message in which the Path Attributes field includes the host route check path attribute.

The specific attribute type, attribute length, attribute value (T-L-V) of the host route check path attribute is not limited in the example, and only some achievement examples of the attribute type field, attribute length filed and attribute value field of the host route check path attribute are described hereinafter.

The attribute type field may include a flag field and a type code field. The flag field and the type code field may respectively take up one byte. In the example, the flag field may indicate that the path attribute belongs to an optional non-transitive attribute, namely, when a router does not support the attribute, the attribute will be ignored, and other IBGP peers will not be informed of the attribute. The type code field may indicate the name of the path attribute. For instance, the value of the type code field may be set as 7, and the router may identify the host route check path attribute according to the value of the type code field. The value of the type code field is not limited in the present example.

The attribute length field may indicate the total length of the host route check path attribute. For instance, the attribute length filed may be set as 4, indicating that the total length of the host route check path attribute is 4.

The attribute value field may indicate the value of the host route check path attribute. The attribute value field may be set as the AS number of a BGP network where the router is located. For instance, the AS number of the BGP network at which the router 341 is located is AS:1000.

In the BGP update message for checking a host route, the two-tuple <32, 10.1.1.1> in the NLRI field describe the host route to be checked. The number of two-tuples in the NLRI field is not limited in the example.

The router 331 may forward the received BGP update message for checking a host route by taking it as an ordinary IP packet and without perceiving whether it is a BGP packet.

After receiving the BGP update message, and determining that the BGP update message carries the host route check path attribute, the router 321 may initiate an ARP checking mechanism. The router 321 may send an ARP request message in the first network according to the IP address prefix 10.1.1.1 in the BGP update message. That is, the target IP address in the ARP request message is 10.1.1.1.

When no ARP response message having the sender IP address 10.1.1.1 is received in a predetermined time period, the router 321 may delete a host route entry of IP address is 10.1.1.1, from the route table.

The router 321 may send a first withdraw message, such as a BGP update message carrying a host route withdraw path attribute, in the first withdraw message, the source IP address and the destination IP address may be respectively the IP address of the router 321 and the IP address of the router 341. In the BGP update message for withdrawing a host route, the number of routes to be withdrawn included in the Withdrawn Routes Length field is 1, and the Withdrawn Routes field includes a two-tuple <32, 10.1.1.1>. The example may adopt some existing implementation of T-L-V of a route withdraw path attribute, and no further description of implementation of T-L-V of the host route withdraw path attribute will be given hereinafter.

In the example, the router 321 cleverly utilizes the characteristics of the ARP message, determines a virtual machine which does not feedback a ARP response message in a predetermined time period as a migrated virtual machine, thus the virtual migration detection is achieved.

The router 331 may forward the BGP update message carrying a host route withdraw path attribute to the router 341.

The router 341 may receive the BGP update message, identify the host route withdraw path attribute carried in the BGP update message, and find a host route entry configured with a to-be-checked identifier from the route table according to the IP address prefix 10.1.1.1 and the length of the IP address prefix 32 carried in the Withdrawn Routes field. The router 341 may remove the to-be-checked identifier from the found host route entry. Thus in the route table, the next-hop in the host route entry with 10.1.1.1/32 is tunnel 2.

When the router 321, according to a local host route entry, sends a BGP update message carrying a host route path attribute again, the router 341 receives the BGP update message, and identifies the host route path attribute carried in the BGP update message, searches out a corresponding host route entry according to an IP address prefix in the NLRI field, and the next-top in the found host route entry is tunnel 1, the router 321 does not do any processing to the searched out host route entry.

When a host (VM) in the first network disconnects with the network for some reasons, the router 321 may further delete the host route entry according to a preset condition, and initiatively send a second withdraw message, such as a BGP update message for withdrawing a host route. When the router 341 receive the BGP update message, identify the host route withdraw path attribute carried in the BGP update message, and find corresponding host route entry according to the IP address prefix in the NLRI, the router 341 may delete the found host route entry. In the example, whether the router 321 initiatively deletes the preset condition of the host route entry is not limited. Examples as to the reasons which may result in the change of the host route and the deletion of the host route entry are given hereinafter. For instance, a port via which the router 321 connects with a server is down, a ARP entry of the router 321 is deleted, a ACL filtering rule with which the router 321 releases a host route is amended, a VM has failed to migrate due a server on which the virtual machine is located being down, or the like.

In the example, the router, which is taken as an entrance network device of a service provider, determines that a received BGP update message carries a host route path attribute. When the router does not support the host route path attribute, the router may ignore the BGP update message carrying the host route path attribute.

The present disclosure may also be applied to the Internet protocol version 6 (IPv6) network. For instance, a virtual machine may send a neighbor solicitation (NS) message, a gateway may obtain a host IP address according to the source IP address of the NS message, and generate a host route according to the host IP address. In a host route entry, the IP address prefix may be the IP address of a host in the IPv6 network; and the length of the IP address prefix may equal to the length of the IP address of the host in the IPv6 network, namely 128. The passenger protocol of a GRE tunnel established by the router 341 may be IPv6 protocol.

In the example, when a virtual machine migrates between different layer-2 networks, an entrance network device may update a route table according to a host route released by a gateway of a layer-2 network where the virtual machine is located currently, and send received data packet to the gateway of the layer-2 network where the virtual machine is located currently, thus the access to a host of migrated virtual machine is achieved.

In the example, the type code in the BGP update message carrying a host route path attribute differs from the type code in the BGP update message carrying a host route check path attribute. However, the attribute length filed in the BGP update message carrying a host route path attribute may be the same as that in the BGP update message carrying a host route check path attribute. The AS numbers of IBGP peers may be the same.

Figure 6:
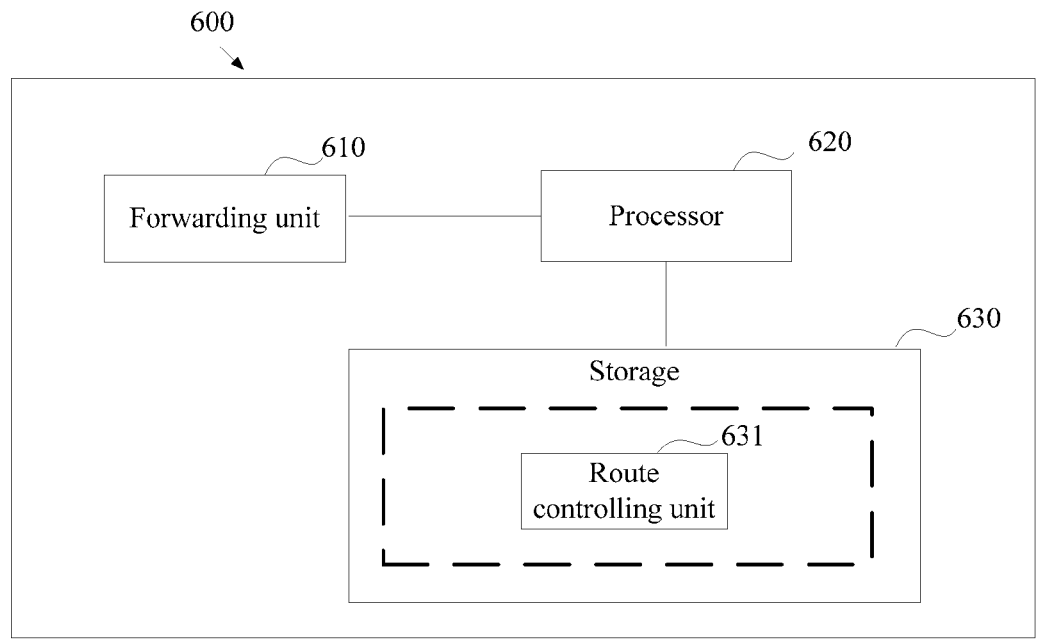
FIG. 6 is a schematic diagram illustrating a device for generating a host route according to an example of the present disclosure.

FIG. 6 is a schematic diagram illustrating a device for generating a host route according to an example of the present disclosure. As shown in FIG. 6, the device 600 may include a forwarding unit 610, a processor 620 and a storage 630 which has a communication connection with the processor 620. The storage 630 may include one or more program modules to be executed by the processor 620, the one or more program modules may include a route controlling unit 631.

The route controlling unit 631 may generate a host route entry according to an IP address of a virtual machine, and generate an update message carrying a host route of the generated host route entry. An IP address prefix of the host route and a length of the IP address prefix respectively correspond an IP address of the virtual machine and a length of the IP address. The forwarding unit 610 may store the generated host route entry, and send the update message to an IBGP peer.

The forwarding unit 610 may receive a check message came from the IBGP peer. The route controlling unit 631 may check the reachability of the host route in the check message.

The router controlling unit 631 may generate a first withdraw message carrying an IP address prefix of an unreachable host route and a length of the IP address prefix. The forwarding unit 610 may send the first withdraw message to an IBGP peer.

The route controlling unit 631 may delete the host route entry recorded by the forwarding unit 610, generate a second withdraw message carrying an IP address prefix of a host route in the deleted host route entry and a length of the IP address prefix. The forwarding unit 610 may send the second withdraw message to the IBGP peer.

The forwarding unit 610 may receive a GRE tunnel packet from the IBGP peer, decapsulate the GRE tunnel packet into an IP packet, find a host route entry according to the IP address of the IP packet, and send the IP packet via an interface according to the next-top in the found host route entry.

Figure 7:
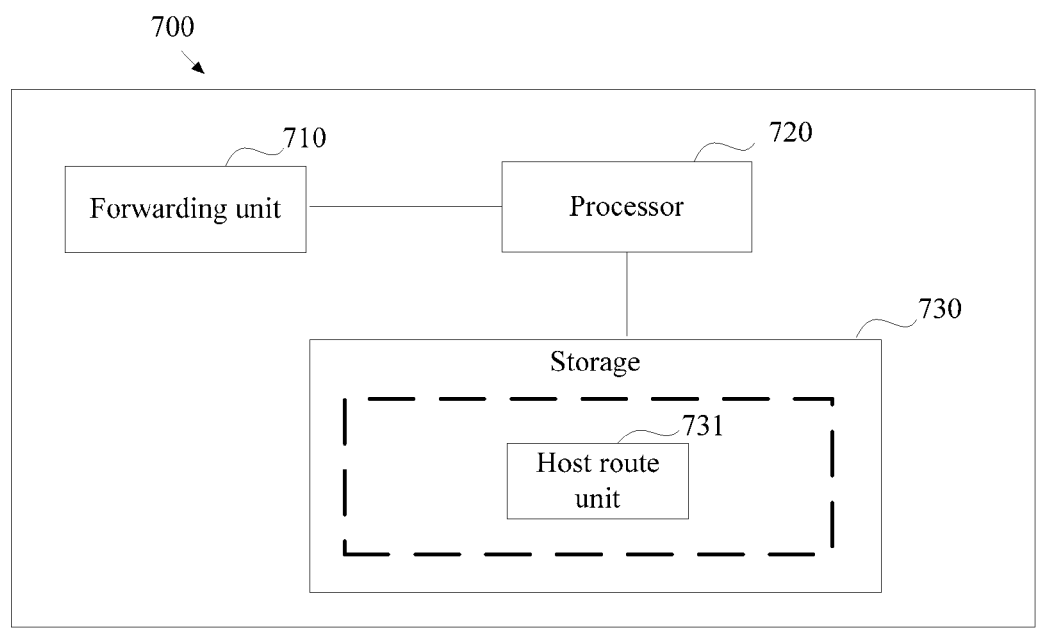
FIG. 7 is a schematic diagram illustrating a device for generating a host route according to another example of the present disclosure.

FIG. 7 is a schematic diagram illustrating a device for generating a host route according to another example of the present disclosure. As shown in FIG. 7, the device may include a forwarding unit 710, a processor 720 and a storage 730 which has communication connection with the processor 720. The storage 730 may include one or more program modules to be executed by the processor 720, the one or more program modules may include a host route unit 731.

The forwarding unit 731 may receive an update message came from an IBGP peer.

When not searching out a host route entry matching with an IP address prefix of a host route in the update message and a length of the IP address prefix from a route table in the forwarding unit 710, the host route unit 731 may generate a host route entry and store the host route entry in the route table. The host route in the generated host route entry is the host route in the update message, and the next-top in the generated host route entry is a GRE tunnel connecting the IBGP peer.

When searching out a host route entry matching with an IP address prefix of a host route in the update message and a length of the IP address prefix from the route table, and the next-top in the host route entry differs from the GRE tunnel connecting the IBGP peer, the host route unit 731 may amend the next-top in the host route entry to a GRE tunnel connecting the IBGP peer, configure a to-be-checked identifier, and generate a check message according to an IP address prefix of a host route entry configure with the to-be-checked identifier and a length of the IP address prefix. The forwarding unit 710 may send the check message to the previous next-top of the host route entry configured with the to-be-checked identifier.

The forwarding unit 710 may further receive a first withdraw message came from the previous next-top. The first withdraw message includes an IP address prefix of an unreachable host route and a length of the IP address prefix. The host route unit 731 may find the host route entry configured with a to-be-checked identifier from the forwarding unit 710 according to the IP address prefix of the unreachable host route and the length of the IP address prefix, and delete the to-be-checked identifier.

The forwarding unit 710 may further receive a second withdraw message came from the IBGP peer. The host route unit 731 may find a host route entry according to the IP address prefix of the host route carried in the second withdraw message and the length of the IP address prefix, and delete the found host route entry.

The forwarding unit 710 may receive an IP packet, and encapsulate the IP packet into a GRE tunnel packet according to the next-top in a host route entry matching with the destination IP address of the IP packet, and send the GRE tunnel packet to the IBGP peer.

The methods and devices provided by examples of the present disclosure may be achieved by hardware, or machine-readable instructions, or a combination of hardware and machine-readable instructions. The machine-readable instructions may be stored, by at least one processor, in a non-transitory computer readable storage medium, such as a hard disk, a floppy disk, a magnetic disk, compact disk (e.g., CD-ROM, CD-R, CD-RW, DVD-ROM, DVD-RAM, DVD-RW and DVD+RW), a tape, a nonvolatile memory card, ROM and other suitable storage device. Or part of the machine-readable instructions may be achieved by specific hardware, such as custom integrated circuits, gate arrays, FPGA, PLD, a computer of specific functions, etc.

Examples of the present disclosure also provide a computer readable storage medium, which is configured to store machine-readable instructions for making a computing device (may be a personal computer, a server, a network device, etc.) execute the method of the examples. Specifically, the system and device provided by the examples of the present disclosure all include a computer readable storage medium, which stores machine-readable program codes for achieving functions of above mentioned examples. The system and device (or CPU or MPU) may read out and execute the machine-readable program codes stored in the computer readable storage medium.

In this case, the program codes read from the computer readable storage medium can achieve anyone of above mentioned examples. Therefore, the program codes and the storage medium storing the program codes are a part of technical solutions of the present disclosure.

The storage medium for providing program codes includes a hard disk, a floppy disk, a magnetic disk, compact disk (e.g., CD-ROM, CD-R, CD-RW, DVD-ROM, DVD-RAM, DVD-RW and DVD+RW), a tape, a Flash card, ROM, and so on. Optionally, it is possible to download the program codes from a server computer via a communication network.

It should be noted that, for the program codes being executed by a computer, a part of or all of operations achieved by the program codes may be implemented by an operating system running on a computer, so as to achieve technical solutions of anyone of example mentioned above. The computer executes instructions based on the program codes.

The program codes in the storage medium are written in a memory, and the memory is located in an extended board inside a computer, or in an extended unit connected with a computer. In the example, a CPU on the extended board or the extended unit executes a part of or all of the actual operations based on the program codes, so as to realize technical solutions of any of the aforementioned embodiments.

The foregoing description, for purpose of explanation, has been described with reference to specific examples. However, the illustrative discussions above are not intended to be exhaustive or to limit the present disclosure to the precise forms disclosed. Many modifications and variations are possible in view of the above teachings. The examples were chosen and described in order to best explain the principles of the present disclosure and its practical applications, to thereby enable others skilled in the art to best utilize the present disclosure and various examples with various modifications as are suited to the particular use contemplated.

What is claimed is:

1. A method for generating a host route, comprising:
receiving, by a router of a first network, a message including an Internet Protocol (IP) address of a virtual machine within the first network;
based on the IP address of the virtual machine, generating, by the router, a host route entry in a forwarding table for the virtual machine, the host route entry comprising a host route including an IP address prefix and a value indicating a length of the IP address prefix, wherein the IP address prefix in the host route entry for the virtual machine is the IP address of the virtual machine and the value indicating the length of the IP address prefix in the host route entry is a length of the IP address of the virtual machine;
subsequent to generating the host route entry for the virtual machine and while the virtual machine is in the first network, sending, by the router of the first network, an update message including the host route of the host route entry of the virtual machine to an internal border gateway protocol (IBGP) peer in a second network, the host route in the update message including the IP address of the virtual machine and a value indicating the length of the IP address of the virtual machine.

2. The method according to claim 1, further comprising:
receiving a check message from the IBGP peer;
checking a reachability of a host route in the check message.

3. The method according to claim 1, further comprising:
sending a withdraw message to the IBGP peer, the withdraw message comprising an IP address prefix of an unreachable host route and a length of the IP address prefix.

4. The method according to claim 1, further comprising:
deleting the host route entry;
sending a withdraw message to the IBGP peer, the withdraw message comprising the IP address prefix of the host route in the deleted host route entry and the value indicating the length of the IP address prefix.

5. The method according to claim 1, further comprising:
receiving a general route encapsulation (GRE) tunnel packet from the IBGP peer;
decapsulating the GRE tunnel packet into an IP packet;
forwarding the IP packet according to a next-hop in a host route entry corresponding to a destination IP address of the IP packet.

6. A routing device for a first network, comprising:
a processor; and
a memory storing instructions that when executed by the processor cause the processor to:
receive from a virtual machine in the first network a message including an Internet Protocol (IP) address of the virtual machine;
based on the IP address of the virtual machine, generate a host route entry in a forwarding table for the virtual machine, the host route entry comprising a host route including an IP address prefix and a value indicating a length of the IP address prefix, wherein the IP address prefix of the host route in the host route entry for the virtual machine is the IP address of the virtual machine and the value indicating the length of the IP address prefix is a length of the IP address of the virtual machine;
store the host route entry in the forwarding table; and
while the virtual machine is in the first network, send an update message including the host route of the host route entry of the virtual machine to an internal border gateway protocol (IBGP) peer in a second network, the host route in the update message including the IP address of the virtual machine and a value indicating the length of the IP address of the virtual machine.

7. The routing device according to claim 6, wherein the instructions are to cause the processor to:
receive a check message came from the IBGP peer; and
check a reachability of a host route in the check message.

8. The routing device according to claim 6, wherein the instructions are to cause the processor to:
generate a withdraw message comprising an IP address prefix of an unreachable host route and a length of the IP address prefix; and
send the withdraw message to the IBGP peer.

9. The routing device according to claim 6, wherein the instructions are to cause the processor to:
delete the host route entry stored in the forwarding table;
generate a withdraw message comprising the IP address prefix of the host route corresponding to the deleted host route entry and the value indicating the length of the IP address prefix; and
send the withdraw message to the IBGP peer.

10. The routing device according to claim 6, wherein the instructions are to cause the processor to:
receive a general route encapsulation (GRE) tunnel packet from the IBGP peer;
decapsulate the GRE tunnel packet into an IP packet;
find a host route entry according to a destination IP address of the IP packet; and
forward the IP packet according to a next-hop in the found host route entry.

11. A method for generating a host route, comprising:
receiving, at a routing device of a first network, an update message from an internal border gateway protocol (IBGP) peer of a second network, the update message comprising a host route to a virtual machine in the second network, the host route in the update message including an Internet Protocol (IP) address prefix and a value indicating a length of the IP address prefix;
searching, by the routing device of the first network, in a route table of the routing device for a host route entry having an IP address of a virtual machine matching the IP address prefix of the host route in the update message and a length of the IP address of the virtual machine matching the value of the length of the IP address prefix in the update message; and
in response to not finding a host route entry matching the host route in the update message, generating a host route entry in the route table of the routing device according to the host route in the update message, and determining a next-hop in the host route entry to be a General Routing Encapsulation (GRE) tunnel connecting the routing device of the first network with the IBGP peer of the second network.

12. The method according to claim 11, further comprising:
in response to finding a host route entry matching with the IP address prefix of the host route in the update message and the length of the IP address prefix in the route table, and determining that the next-hop in the host route entry differs from the GRE tunnel connecting the IBGP peer, amending the next-hop in the host route entry to a GRE tunnel connecting the IBGP peer with the routing device to include a to-be-checked identifier; and sending a check message to a previous next-hop of the host route entry that includes the to-be-checked identifier, the check message comprising an IP address prefix of a host route in the host route entry that includes the to-be-checked identifier and a length of the IP address prefix.

13. The method according to claim 12, further comprising:
receiving a withdraw message from the previous next-hop, the withdraw message comprising an IP address prefix of an unreachable host route and a length of the IP address prefix of the unreachable host route;
searching for and finding the host route entry that includes the to-be-checked identifier according to the IP address prefix of the unreachable host route and the length of the IP address prefix; and
deleting the to-be-checked identifier.

14. The method according to claim 11, further comprising:
receiving a withdraw message from the IBGP peer;
deleting a host route entry in the route table matching with an IP address prefix of a host route carried in the withdraw message and a length of the IP address prefix.

15. The method according to claim 11, further comprising:
receiving an IP packet;
searching for and finding a host route entry in the route table according to a destination IP address of the IP packet;
encapsulating the IP packet into a GRE tunnel packet according to a GRE tunnel interface of a next-hop in the found host route entry;
sending the GRE tunnel packet to the IBGP peer.

16. A routing device for a first network, comprising:
a processor; and
a memory storing instructions that when executed by the processor cause the processor to:
receive an update message from an Internet Border Gateway Protocol (IBGP) peer of a second network, the update message comprising a host route to a virtual machine located in the second network, the host route in the update message including an Internet Protocol (IP) address prefix and a value indicating a length of the IP address prefix;
search in a route table of the routing device in the first network for a host route entry having an Internet Protocol (IP) address of a virtual machine matching the IP address prefix of the host route in the update message and a length of the IP address of the virtual machine matching the value indicating the length of the IP address prefix in the update message; and
in response to not finding a host route entry matching the IP address prefix of the host route in the update message, generate a host route entry and store the host route entry in the route table, wherein a host route in the generated host route entry is the host route in the update message, and a next-hop in the generated host route entry is a General Routing Encapsulation (GRE) tunnel connecting the routing device of the first network with the IBGP peer of the second network.

17. The routing device according to claim 16, wherein the instructions are to cause the processor to:
when a host route entry matching with the IP address prefix of the host route in the update message and the length of the IP address prefix is found in the route table and a next-hop in the host route entry differs from the GRE tunnel connecting the routing device with the IBGP peer, amend the next-hop in the host route entry to a GRE tunnel connecting the IBGP peer to include a to-be-checked identifier, and generate a check message according to an IP address prefix of the host route entry that includes the to-be-checked identifier and a length of the IP address prefix;
send the check message to a previous next-hop of the host route entry that includes the to-be-checked identifier.

18. The routing device according to claim 17, wherein the instructions are to cause the processor to:
receive a withdraw message from the previous next-hop, the withdraw message comprising an IP address prefix of an unreachable host route and a length of the IP address prefix;
find the host route entry that includes the to-be-checked identifier according to the IP address prefix of the unreachable host route and the length of the IP address prefix, and delete the to-be-checked identifier.

19. The routing device according to claim 16, wherein the instructions are to cause the processor to:
receive a withdraw message from the IBGP peer, the withdraw message including an IP address prefix of a host route and a value indicating a length of the IP address prefix; and
delete a host route entry in the route table according to the IP address prefix of the host route carried in the withdraw message and the length of the IP address prefix.

20. The routing device according to claim 16, wherein the instructions are to cause the processor to:
receive an IP packet, and encapsulate the IP packet into a GRE tunnel packet according to a next-hop in a host route entry matching with a destination IP address of the IP packet, and send the GRE tunnel packet to the IBGP peer.

* * * * *